(12) United States Patent
Osborne et al.

(10) Patent No.: US 6,262,712 B1
(45) Date of Patent: Jul. 17, 2001

(54) HANDLE SENSOR WITH FADE-IN

(75) Inventors: Timothy R. Osborne, Woodinville, WA (US); Hajime Suzuki, Sagamihara; Hidenori Shiroto, Inakadate-mura, both of (JP); Manolito E. Adan, Woodinville; Russell I. Sanchez, Seattle, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/845,274

(22) Filed: Apr. 24, 1997

(51) Int. Cl.[7] ........................................... G09G 5/00
(52) U.S. Cl. ............................... 345/156; 345/161
(58) Field of Search ........................ 345/156, 161, 345/168, 158; 341/22, 23; 463/30, 37, 38, 36; 434/45; 273/148 B

(56) References Cited

U.S. PATENT DOCUMENTS

| | | | |
|---|---|---|---|
| 4,313,113 | * | 1/1982 | Thornburg ........................... 340/709 |
| 4,680,577 | * | 7/1987 | Straayer et al. ..................... 340/711 |
| 5,059,939 | * | 10/1991 | Wu ........................................ 338/93 |
| 5,389,752 | * | 2/1995 | Karbassi ............................... 307/114 |
| 5,589,854 | * | 12/1996 | Tsai ...................................... 345/161 |
| 5,624,117 | * | 4/1997 | Ohkubo et al. ....................... 463/37 |
| 5,694,153 | * | 12/1997 | Aoyagi et al. ....................... 345/161 |
| 5,734,373 | * | 3/1998 | Rosenberg et al. ................ 345/163 |
| 5,739,811 | * | 4/1998 | Rosenberg et al. ................ 345/161 |
| 5,767,839 | * | 6/1998 | Rosenberg ........................... 345/161 |

* cited by examiner

Primary Examiner—Richard A. Hjerpe
Assistant Examiner—Ronald Laneau
(74) Attorney, Agent, or Firm—Ronald M. Anderson

(57) ABSTRACT

An apparatus and a method for controlling a feedback force applied by a joystick to a user gripping the control handle of the joystick. In the preferred embodiment, a light path between an infrared light source and a light sensor is interrupted by a user gripping the handle of a joystick. The output signal from the light sensor is employed by a processor to control the feedback force. When based upon the output signal, the processor determines that the user has just gripped the control handle, the processor enables the feedback force to increase slowly, over a sufficiently long time to enable the user to firmly grip the control handle before the feedback force becomes very strong. The processor immediately disables generation of the feedback force as soon as the user releases the control handle. The processor periodically energizes and then de-energizes the light source, determines an average value of the output signal when the light source is both energized and de-energized, and based upon a comparison of these average values, determines if the user's hand gripping the control handle has interrupted the light path between the source and light sensor. Additionally, the processor checks for a failure of the light source, and if detected, halts the generation of the feedback force.

32 Claims, 7 Drawing Sheets

HANDLE SENSOR WITH FADE-IN

FIELD OF THE INVENTION

The present invention generally relates to an apparatus and a method for controlling a haptic feedback force transmitted to a user by a device, and more specifically, to an apparatus and a method for preventing a force feedback device from applying a feedback force to a control handle unless the user is gripping the control handle.

BACKGROUND OF THE INVENTION

A device having energy that can be potentially harmful to a user or which might damage the device should employ an interlock that enables the safe utilization of the device by the user. In those instances where life safety is an issue, a keyed switch is often used as an interlock to guard against exposing the user to potentially hazardous forces or actions. The provision of an interlock serves to put the user on notice that a particular device is associated with a potentially harmful energy, since the interlock must be successfully engaged before the user can interact with the device. For example, an electrical enclosure having a keyed switch (interlock) is often employed to prevent a user from contacting a dangerous enclosed energy, such as a high voltage. The keyed switch causes devices contained within the electrical enclosure to be de-energized when the user opens the enclosure to access its interior. Although interlocks are often employed to de-energize devices having potentially life threatening energies, they are also used to enable a hazardous device to be energized. For example, a user must be typically seated on a lawn tractor to engage an interlock (keyed switch) under the seat that is actuated by the weight of the user, in order to operate the power take-off drive for the mower blades.

Interlock switches that must be continually actuated by a user to enable a device to operate are commonly referred to as "deadmnan" switches. This term refers to the concept that when the user's actuation of the switch goes slack or "dead," then the interlocked device should be de-energized. Typically, a deadman switch is provided on devices that are firmly grasped by the operator and if released, can independently produce a rapid or sudden movement that may be unsafe to the operator. For example, a hand-held chain saw may include a deadman switch that must be engaged (compressed by the user's grip) before the chain can be driven. If the grip of the operator loosens on the handle, the deadman switch disengages, stopping the chain.

Although a haptic force feedback joystick is not as dangerous as a chain saw, if the control handle is not firmly gripped when the force is applied to the control handle, it can potentially injure a user, possibly causing bruises, or worse. In addition, since the control handle of a force feedback joystick is intended to be held by the user while the force is applied, the drive mechanism and control handle may be damaged if a substantial force is applied while the handle is not grasped. In the prior art, mechanical and/or retro-reflective switches have been employed to stop the movement of a force feedback joystick handle when the user is not gripping the handle. A retro-reflective switch employs a light source that produces a light beam, which is reflected from a user's hand applied to grip the control handle so that the reflected light actuates a light sensor. These prior art solutions have several problems. First, mechanical switches typically require periodic maintenance to prevent failure due to oxidation or breakage of their electrical contacts. Second, mechanical switches having a high duty cycle rating are relatively expensive. Third, retro-reflective switches do not work reliably when the light beam of the switch is broken by a non-reflective material, such as a darkly colored glove or a user's hand that has a dark skin tone. Fourth, ambient light sources can easily cause false triggering of retro-reflective switches. Moreover, the prior art teaches a simple interlock that allows the full magnitude of the force to be applied to the control handle as soon as the user grips the handle. If the user's grip has not yet tightened, the application of maximum force can literally tear the control handle loose from the user, so that it causes injury. Significantly, the prior art does not teach slowly increasing the magnitude of the force when the user initially grips the joystick's handle.

Ideally, a user would prefer that the force be applied slowly as the grip on the control handle is set, but any force being applied should immediately subside when the user loosens a grip on the handle. Further, any sensor applied to detect the user's grip on the control handle should be insensitive to the reflectivity of the user's hand or glove worn on the hand and should also be insensitive to ambient light variation. Currently, none of the prior art interlock or deadman switches for a haptic force feedback joystick addresses these problems. It would also be desirable to employ the technique used to disable force applied to the control handle for safety reasons to interrupt force applied to the control handle when the user elects to pause the execution of an application controlling the computer. If a user presses a keyboard button or other control designated to pause a game or other application running on a host computer, the application of force to the haptic joystick control handle would then be disabled just as if the user had released the control handle. Alternatively, by sensing the user's grip on the joystick control handle, it would be possible to automatically pause the game if the user releases the control handle. Thus, in addition to immediately disabling the application of force applied to the control handle in response to this condition, the application or operating system could be programmed to respond by pausing the application or by causing the host computer to enter a "sleep" mode. None of these features related to pausing an application is provided by any prior art haptic control device.

SUMMARY OF THE INVENTION

In accordance with the present invention, an electrical circuit is defined for controlling a force applied by a device to a user through a member of the device that is gripped by the user. The electrical circuit includes a switch having a first state and a second state. The switch is actuated when the user grips the member, causing the switch to change to the first state. Conversely, the switch changes to the second state when the user releases the member. A processor that is coupled to said switch responds to the state of the switch to control the application of the force to the member. When the switch changes to the second state, indicating that the user has released the member, the processor immediately disables application of the force. Further, after the switch changes to the first state, indicating that the user has just gripped the member, the processor enables a slow increase in the force applied immediately. By immediately disabling the application of force to the member when it is released, the user protected from possible injury. And, by requiring that the force applied to the member slowly increase when the user has just gripped the member, the electrical circuit ensures that the user has sufficient time to fully grip the member before the full magnitude of the force acts on the member.

Another aspect of the present invention is directed to a sensor circuit for determining whether a user is gripping a member of a haptic feedback device to control a force applied to the member. The sensor circuit includes a source of a light signal, and a sensor for detecting the light signal. When the user grips the member, a path of the light signal from the source to the sensor is affected. The sensor produces an output signal indicative of the light signal detected by the sensor, and the output signal changes due to the affect of the user gripping the member. A processor is coupled to the source of the light signal and to the sensor. The processor enables the source to produce the light signal for a first time interval, monitors the output signal of the sensor during the first time interval, disables the source during a second time interval so that the source does not produce the light signal, and monitors the output signal of the sensor during the second time interval. As a function of the output signal during the first time interval and the output signal during the second time interval, the processor determines whether the user is gripping the member. The processor only enables the force to be applied to the member when the user is gripping the member, but not when the user is not gripping the member.

Preferably, the source and the sensor are disposed proximate the member and positioned relative to each other so that the user gripping the member interrupts the path of the light signal between the source and the sensor. The processor preferably monitors the source to determine that the source is operational when enabled. Alternatively, the source and the sensor are disposed proximate the member and positioned relative to each other so that the user gripping the member reflects the light signal from the source toward the sensor.

The processor periodically enables the source, alternating the first time interval with the second time interval. In addition, the processor determines a first average value of the output signal when the source is enabled and a second average value of the output signal when the source is disabled, finds the difference between said average values, and as a function of the difference, determines whether the user is gripping the member.

Preferably, the light signal is within a non-visible waveband. The invention can be applied to a number of different devices. For example, in regard to game control devices, the member can comprise either a control handle, a yoke, a steering wheel, or a digit cradle.

Yet another aspect of the present invention is directed to an electrical circuit for controlling application of a feedback force to a user by a member of a device. The electrical circuit has a source that emits light when energized and a light sensor that provides an output signal indicative of whether light from the source is incident on the sensor. The source and the sensor are disposed proximate the member and spaced apart from each other so that a light path between the source and the sensor is obstructed when the user grips the member, preventing light emitted by the source from reaching the sensor. A processor that is coupled to the sensor receives the output signal and thereby determines when the user is gripping the member. When the user is not -ripping the member, the processor disables generation of the feedback force. As an additional feature, the processor is coupled to the source to determine whether the source has failed. If so, the processor also disables the feedback force.

Still further aspects of the present invention are directed to methods that are generally consistent with the apparatus discussed above. Specifically, the steps of each method implement functions that are com-parable to those of the components of the apparatus.

BRIEF DESCRIPTION OF THE DRAWING FIGURES

The foregoing aspects and m-any of the attendant advantages of this invention will become more readily appreciated as the same becomes better understood by reference to the following detailed description, when taken in conjunction with the accompanying drawings, wherein:

FIG. 3 is a block diagram of the logic flow that determines whether the optical switch is functioning properly;

DESCRIPTION OF THE PREFERRED EMBODIMENT

Figure 1:
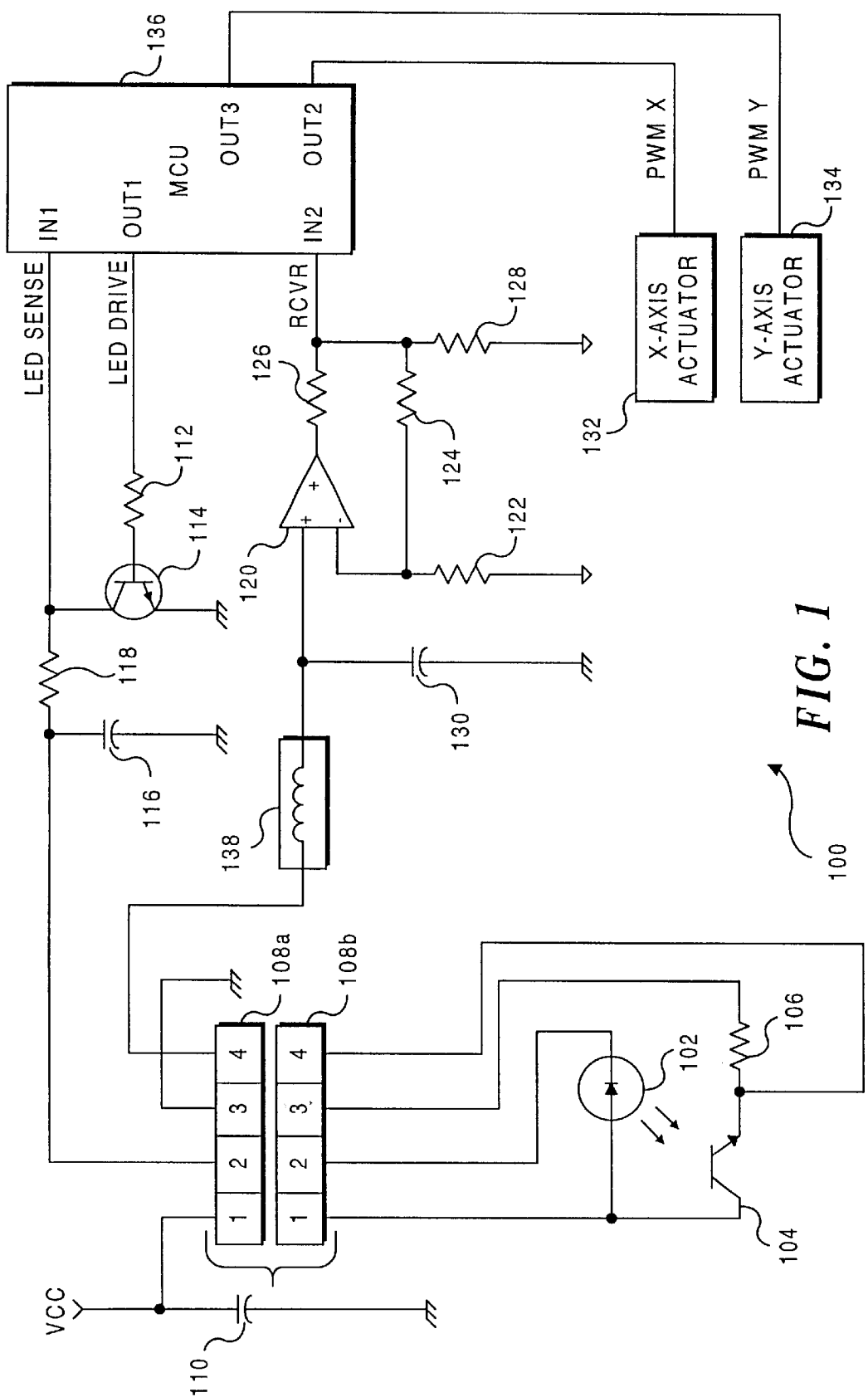
FIG. 1 is an electrical schematic of the preferred embodiment employing an optical switch.

An electrical circuit 100, which is used for controlling feedback force and other aspects of a haptic joystick, is shown in the schematic block diagram of FIG. 1. With reference to this Figure, the anode of a light emitting diode (LED) 102 is connected to terminal I of a connector 108*b*, and the cathode is coupled to terminal 2 of the connector. The collector of a phototransistor 104 is coupled to the anode of LED 102, and the emitter is coupled to terminal 4 of connector 108*b*. One end of a resistor 106 is coupled to the emitter of transistor 104, and the other end of the resistor is connected to terminal 3 of connector 108*b*. In the preferred embodiment, the light emitted by LED 102 lies within the infrared waveband, and phototransistor 104 conducts when infrared light is incident upon its base. Thus, an optical switch is formed by LED 102 and phototransistor 104, which thus respectively comprise the source and light sensor of the optical switch. The optical switch has two states. When the infrared light from LED 102 strikes the base of phototransistor 104, the optical switch is in a conductive state, and when the light path between the phototransistor and the LED is affected by an object, e.g., the presence of the hand of the user grasping the control handle of the joystick interrupting the light path, the phototransistor changes to a non-conductive state.

Figure 4:
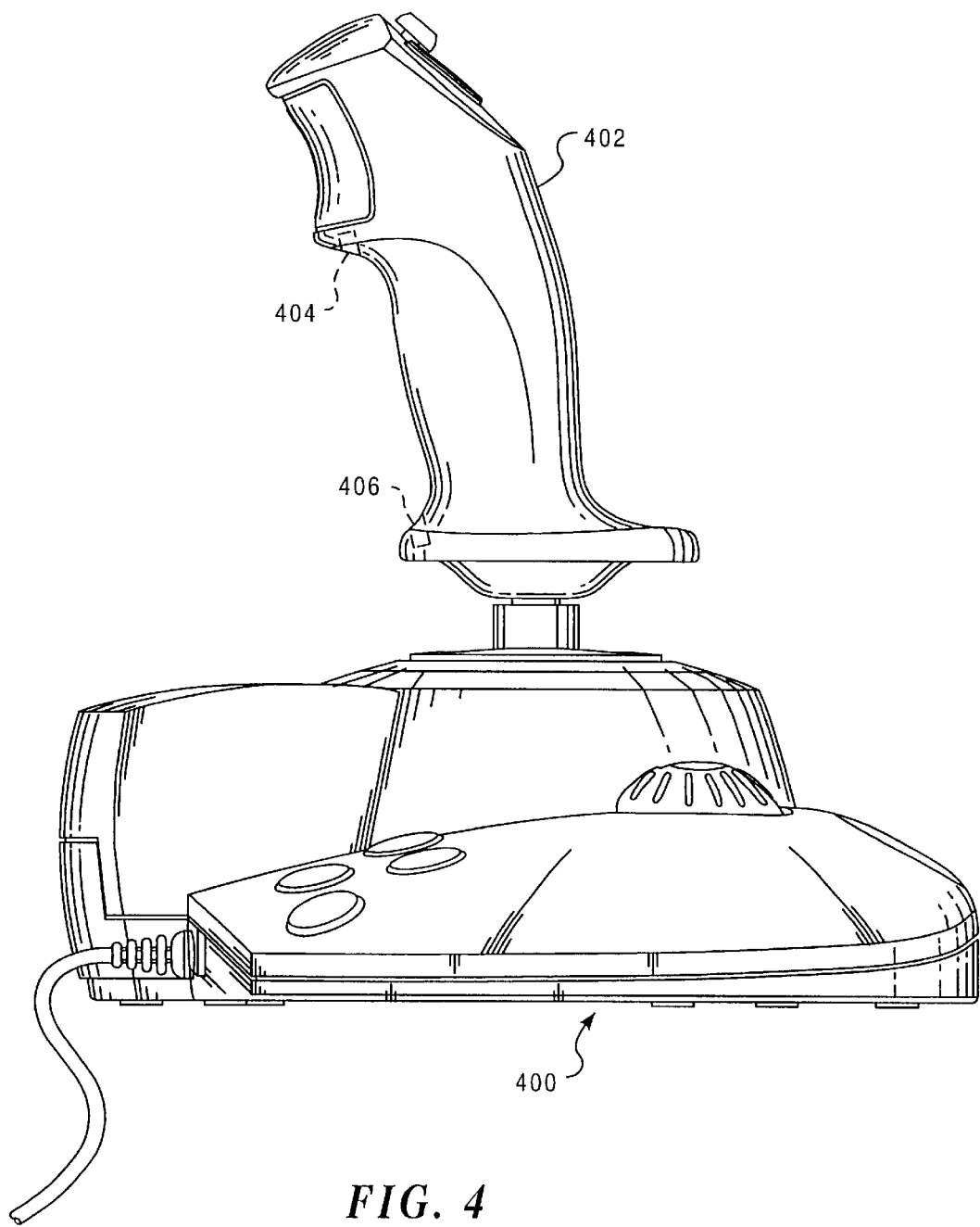
FIG. 4 is a side elevational view of a haptic (force feedback) joystick to which the present invention is applied as a preferred embodiment.

As shown in FIG. 4, a control handle 402 of a haptic joystick 400 to which the present invention is applied includes an orifice 404 disposed on the front surface of the joystick's handle (below the trigger switch). Phototransistor 104 is disposed within orifice 404. Similarly, an orifice 406 is disposed below the front surface of control handle 402 that is gripped by the user, and LED 102 is disposed within this orifice so that the light it emits is directed toward phototransistor 104. It will be noted that the positions of LED 102 and phototransistor 104 can be interchanged without affecting the operation of the optical switch. With this configuration, an uninterrupted light path is provided between the source (LED 102) and light sensor (phototransistor 104) until the user grips the joystick control handle. When the user grips control handle 402, the user's hand interrupts the light path between orifices 404 and 406, which stops the conduction of the optical switch and changes its output signal. This change in the output signal caused by the user gripping the control handle enables the generation of force feedback, but the magnitude of the force applied to the control handle ramps up relatively slowly after the user's hand first wraps around the control handle. Limiting the initial force applied to the control handle in this manner avoids the possibility that user will be surprised by the application of an unexpectedly strong force before firmly gripping the control handle.

Referring back to FIG. 1, a connector 108a having numbered terminals corresponding to those of connector 108b is mated to connector 108b to link the optical switch (which is disposed in the control handle of the joystick) to the remaining components of electrical circuit 100. Significantly, connectors 108a and 108b enable ready replacement of the optical switch components (phototransistor 104 and LED 102) without disturbing the other components in the electrical circuit. Most of the other components of electrical circuit 100 are preferably disposed in the more spacious base of the joystick.

One end of a capacitor 110 is connected to earth ground, and the other end is coupled to VCC (+5 volts) and to terminal 1 of connector 108a. A capacitor 116 is connected between earth ground and terminal 2 of connector 108a. One end of a resistor 118 is also coupled to terminal 2 of connector 108a, and the other end of the resistor is coupled to the collector of an NPN transistor 114. The emitter of NPN transistor 114 is connected to earth ground, and its base is connected to one side of a resistor 112. The other side of resistor 112 is connected to an OUT1 output port of a microcontroller unit (MCU) 136. MCU 136 includes both random access memory (RAM) and read only memory (ROM), although neither are separately shown. The ROM is used for storing machine instructions that control the operation of MCU 136, both in regard to the operation of the haptic joystick, and more importantly, the function of the present invention. Although MCU 136 preferably comprises a microcontroller unit, it may alternatively comprise a microprocessor or central processing unit with integrated circuits for memory, an analog-to-digital converter (ADC) chip, and other functions that are included in the single integrated circuit employed for the MCU.

An IN1 input port of MCU 136 is coupled to the other end of resistor 118 and to the collector of transistor 114. When MCU 136 sets the LED DRIVE signal at the OUT1 output port high, the signal is provided at the base of transistor 114, which causes the transistor to conduct. The conduction of transistor 114 enables an electrical current to flow from VCC through LED 102 to ground, through transistor 114. The current flowing through LED 102 whenever transistor 114 conducts causes the LED to emit infrared light.

When LED 102 is conducting, the LED SENSE signal applied to the IN1 input port of MCU 136 should be equal to the voltage drop across the collector and emitter of NPN transistor 114, unless the LED has failed, creating an open circuit back to VCC. Such a failure of LED 102 would cause the LED SENSE signal to instead be equal to zero volts (once capacitor 116 is discharged). However, MCU 136 does not provide a continuous LED DRIVE signal to the base of transistor 114. Instead, the LED DRIVE signal is a series of periodic pulses, so that the LED DRIVE signal is high for 250 microseconds and low for 1.75 milliseconds. Although the conduction of LED 102 is pulsed on and off, MCU 136 monitors and stores the LED SENSE signal values produced at the IN1 input port during both conditions, i.e., during the discrete times that the LED is energized as well as when it is not energized. In this manner, the LED SENSE signal produced at the IN1 input port enables MCU 136 to determine the conduction for LED 102 and the proper operation of NPN transistor 114, and thus, to determine if either the LED or the NPN transistor has failed.

A capacitor 130 is connected between earth ground and the non-inverting input of an operational amplifier (op amp) 120. An inductor 138 is optionally connected in series between a terminal 4 of connector 108a and the non-inverting input of op amp 120. The inductor and capacitor 130 comprise a filter. Typically, inductor 138 takes the form of a ferrite bead or a core encircled by a few turns of wire. The disposition of inductor 138 makes the connection to the non-inverting input of op amp 120 slightly inductive, so that the input impedance is raised relative to high frequency signals. In this way, oscillation of electrical circuit 100 is prevented, which might cause the emission of, or susceptibility to, radio frequency interference (RFI) by the circuit.

Also, terminal 3 of connector 108a is coupled to earth ground. One end of each of resistors 122 and 124 is connected in common to the inverting input of the op amp. The other end of resistor 122 is connected to the common ground, and the other end of resistor 124 is connected to an IN2 input port of MCU 136. Also connected to the IN2 input port is an end of each of resistors 126 and 128. The other end of resistor 126 is connected to the output of op amp 120, while the other end of resistor 128 is connected to the common ground. The configuration of op amp 120 and resistors 122, 124, 126, and 128 define a fixed gain amplifier, where the gain is controlled by the resistance values. The signal produced at the emitter of phototransistor 104 is sensed by the non-inverting input of op amp 120. The fixed gain amplifier increases the magnitude of the sensed signal, so that the RCVR signal output by op amp 120 and applied to the IN2 input port of MCU 136 is nearly equal to VCC when phototransistor 104 conducts. As described above, MCU 136 causes LED 102 to be periodically energized with LED DRIVE signal pulses that cause the LED to emit infrared light pulses in a corresponding periodic manner. So long as the user is not gripping the control handle of the joystick, the light pulses incident on the base of phototransistor 104 cause a further corresponding periodic conduction of the phototransistor. The periodic conduction of phototransistor 104 is reflected in the pulsing of the RCVR signal presented at the IN2 input port of MCU 136.

An X-axis actuator 132 is coupled to the OUT2 output port of MCU 136 and is controlled by a pulse width modulated (PWM) X signal provided by the MCU. X-axis actuator 132 generates a feedback force directed along the X-axis of the joystick device that is applied to the control handle of the joystick. The magnitude of the X-axis feedback force is in proportion to the magnitude of the PWM X signal. The OUT3 output port of MCU 136 is coupled to a Y-axis actuator 134, which employs the PWM Y signal to control the generation of a force along the Y-axis that is applied to the control handle of the joystick. If the user is gripping the control handle, the user will experience the feedback force that is transmitted to the user's hand through the control handle.

Significantly, if the program executed by MCU 136 determines that the values of the LED SENSE signals monitored during the times that LED 102 is (should be) either energized or de-energized are inconsistent with the proper operation of the LED, i.e., determines that the LED has failed, then the MCU will immediately disable output of the signals PWM X and PWM Y that would otherwise be provided to X-axis and Y-axis actuators 132 and 134.

The values of the RCVR signal during the times that LED 102 is periodically energized and de-energized are independently averaged, and their difference is employed to determine whether the light path between the LED and the phototransistor has been broken by the user gripping the control handle of the joystick. When it is determined that the average values of the RCVR signal during the times that the LED is energized and de-energized are nearly the same, then the beam is considered broken by a user's hand gripping the handle. This is an important feature of the present invention. Using a more conventional mode of operation for the optical switch would be less reliable. Specifically, if the LED were continuously energized and if the level of the RCVR signal were monitored to detect a change in magnitude caused by the user gripping or releasing the control handle, it could be difficult to differentiate between that cause and changes in the magnitude due to variations in ambient light level.

Figure 2:
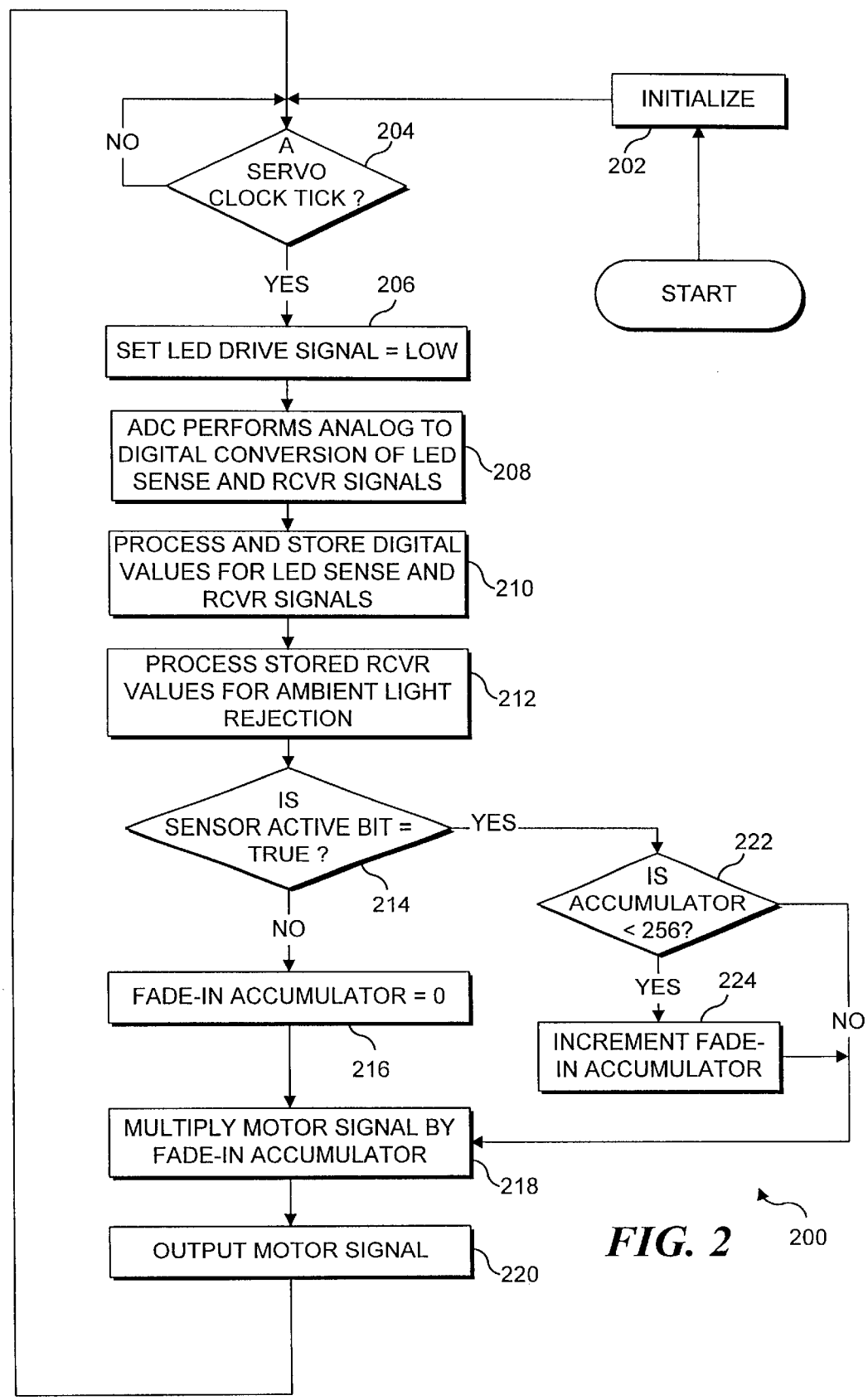
FIG. 2 is a block diagram of the logic flow that determines the slow turn on and fast turn off m-odes of operation.

The following discussion of a flow chart 200 shown in FIG. 2 addresses the logic of a program executed by MCU 136. The present invention virtually eliminates false triggers of the optical switch caused by ambient light sources and enables a slow increase (or ramping up) of feedback force to occur when the user grips the control handle, but an immediate disabling of the feedback force when the user releases the control handle. Beginning at a start block, the logic moves to a block 202, which provides for initializing variables and storing the current value of the servo clock. Initialization includes setting the values of an "on" accumulator, "off" accumulator, and fade-in accumulator to zero, and a counter's value to eight. Further, an LED "on" error bit, LED "off" error bit, sensor error bit, and sensor active bit are set to false. Like most processing devices, MCU 136 includes a time base that is used for all timing functions. In the present invention, the time base is employed as a servo clock that periodically generates a servo clock "tick" when looping through the main body of the program. The logic moves to a decision block 204, and a determination is made as to whether the difference between a current servo clock value and the stored clock value is greater than a servo clock tick interval, which in the preferred embodiment, is two milliseconds. If the difference is not greater than this time interval, then the logic flow continues to loop through decision block 204 until an affirmative determination is made. Once a servo clock tick interval is determined to have elapsed, and the current value of the servo clock is stored, the logic jumps to a block 206 and the value of the LED DRIVE signal is set low. It will be recalled that LED 102 conducts and emits infrared light only when the LED DRIVE signal is high. Further, the infrared light must be incident upon the base of phototransistor 104 to cause the phototransistor to turn "on," and pull the value of the RCVR signal high. Thus, a low value for the LED DRIVE signal will turn "off" LED 102.

Figure 3A:
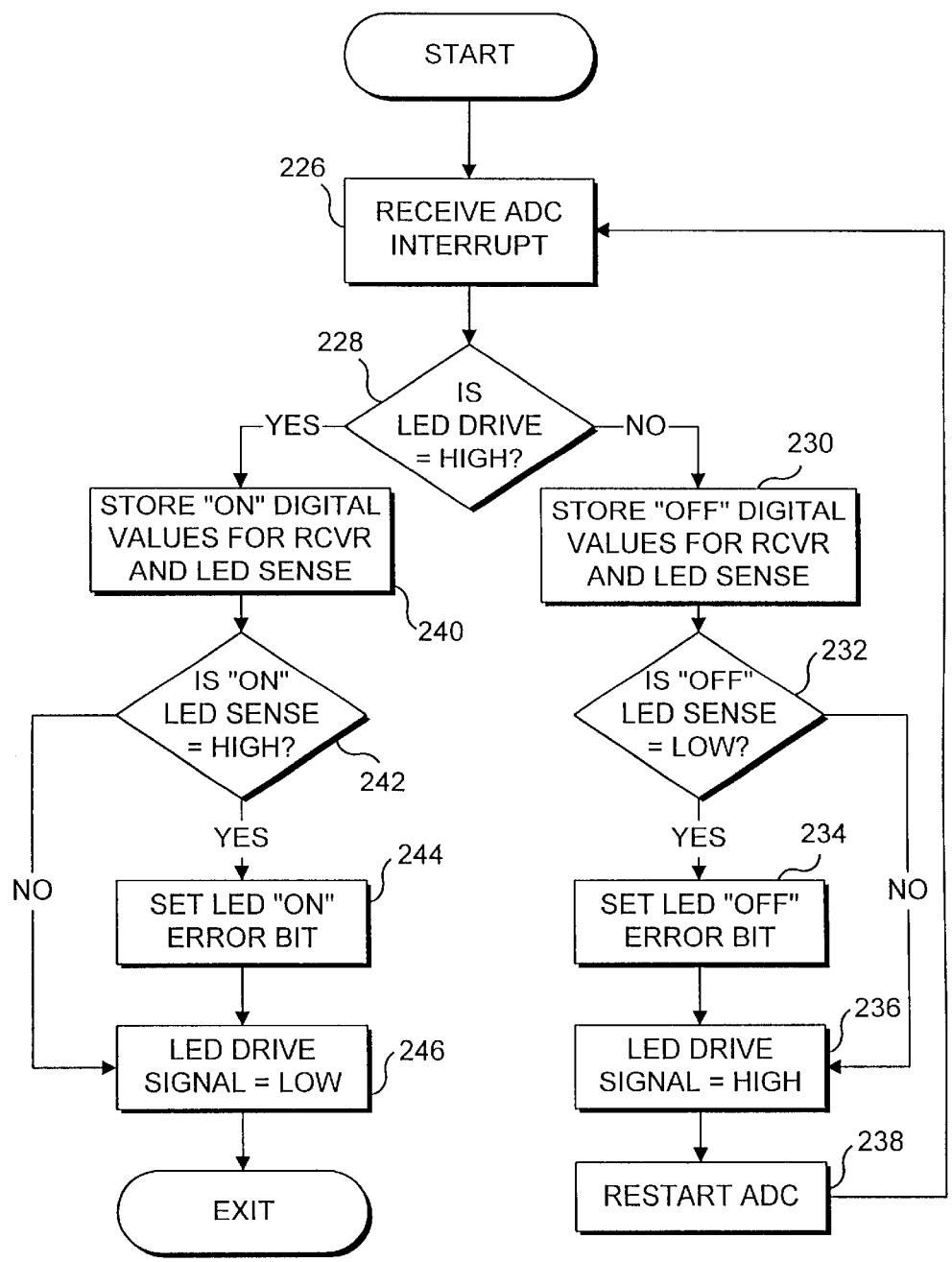
FIG. 3A is a block diagram of the logic flow that determines the processing and storing of digitized values that are employed to ensure the correct operation of the sensor in the preferred embodiment.

The logic moves to a block 208, and an ADC circuit that is internally disposed within MCU 136 is employed to digitize the values of the LED SENSE and RCVR signals. A software interrupt is provided by the ADC to the program when the analog-to-digital (A-D) conversion is completed. The logic advances to a block 210 where the digitized values for the LED SENSE and RCVR signals are stored, and the LED SENSE signals are processed to determine if LED 102 is operating correctly. In the discussion of FIG. 3A below, a detailed description of the logic performed within block 210 is provided. Next, the logic moves to a block 212, which indicates that logical steps are performed to reject false triggering of phototransistor 104 by ambient light. A more complete description of the steps referenced by block 212 is provided below in FIG. 3B.

Moving now to a decision block 214, a determination is made as to whether a sensor active bit is true. If the determination is negative, the logic advances to a block 216 and the fade-in accumulator value is set equal to zero. The logic flows to a block 218, and the motor drive signal is multiplied by the fade-in accumulator value yielding a product equal to the new motor drive signal. The logic advances to a block 220, and MCU 136 outputs the new motor drive signal as pulse width modulated signals (PWM Y and PWM X) to X axis actuator 132 and Y axis actuator 134, respectively. Next, the logic loops back to block 204 to repeat the logic flow. It is important to note that multiplying the motor signal by a fade-in accumulator value of zero will also create a new motor drive signal value of zero. In this way, the generation of force feedback by the actuators will be stopped whenever the sensor active bit is set to false, thereby disabling the application of force to the control handle by the actuators.

However, if the determination at decision block 214 was affirmative, the logic advances to a decision block 222 to determine whether the value stored in the fade-in accumulator is less than 256. If not, the logic jumps to a block 218, and the logic flow continues as discussed above. If the determination in decision block 222 is true, the logic proceeds to a block 224, and the fade-in accumulator is incremented. Next, the logic steps to block 218, continuing as discussed above.

The program steps implemented with the digitized values of the LED SENSE and RCVR signals are shown in a flow chart of block 210 in FIG. 3A. Beginning at a start block, the logic advances to a block 226, in which the software interrupt generated by the ADC of MCU 136 is received. Once the software interrupt is received, the logic moves to a decision block 228, and a determination is made as to whether the LED DRIVE signal is high. As discussed in detail above, when the LED DRIVE signal is high, LED 102 is "on" (conducting), and when the signal is low the LED is "off" (non-conducting).

If the determination at decision block 228 is false, the logic advances to a block 230, which provides for storing the digitized "off" values for the RCVR signal, and the LED SENSE signal. The logic steps to a decision block 232 and determines whether the "off" LED SENSE value is low. Significantly, the digitized value of the "off" LED SENSE signal is only employed to determine if the range of the digitized value is low. Although the precise value of the "off" LED SENSE signal is not considered in the determination, it is envisioned that a sense resistor could be employed in another embodiment to provide the actual flow of current through LED 102. In this way, the conductivity of LED 102 may be monitored. If the determination at decision block 232 is true, the logic advances to a block 234, and the LED "off" error bit is set to true. The logic proceeds to a block 236, and the LED DRIVE signal is set high so that LED 102 will turn "on" and begin conducting. If the determination at decision block 232 is false, the logic skips block 234 and jumps to block 236. After block 236, the logic moves to a block 238, and the A-D conversion of the RCVR and LED SENSE signals by the ADC is restarted. The logic loops back to block 226 and the waits to receive the software interrupt from the ADC that signifies the A-D conversion is complete.

Once the software interrupt signal is received, the logic returns to decision block 228 again to determine if the LED DRIVE signal is set high. If true, the logic advances to a block 240, and the digitized "on" values of the RCVR and LED SENSE signals are stored. The logic then proceeds to a decision block 242 to determine if the LED SENSE signal is high. If affirmative, the logic advances to a block 244, and the LED "on" error bit is set to true. The logic steps to a block 246, and the LED DRIVE signal is driven low. If the determination at decision block 242 is negative, the logic jumps to block 246. An exit block follows block 246, indicating a return to the main program in FIG. 2.

As described in the discussion of FIG. 3A above, the conduction/non-conduction of LED 102 is cycled by the logic flow of the program, so that for each tick (two milliseconds) of the servo clock, LED 102 is "on" (conducting) for 0.250 milliseconds and "off" (non-conducting) for 1.75 milliseconds. The relatively brief "on" time interval versus the substantially longer "off" interval is provided to insure that both states of LED 102 are sampled during each servo tick and to reduce power dissipation.

Figure 3B:
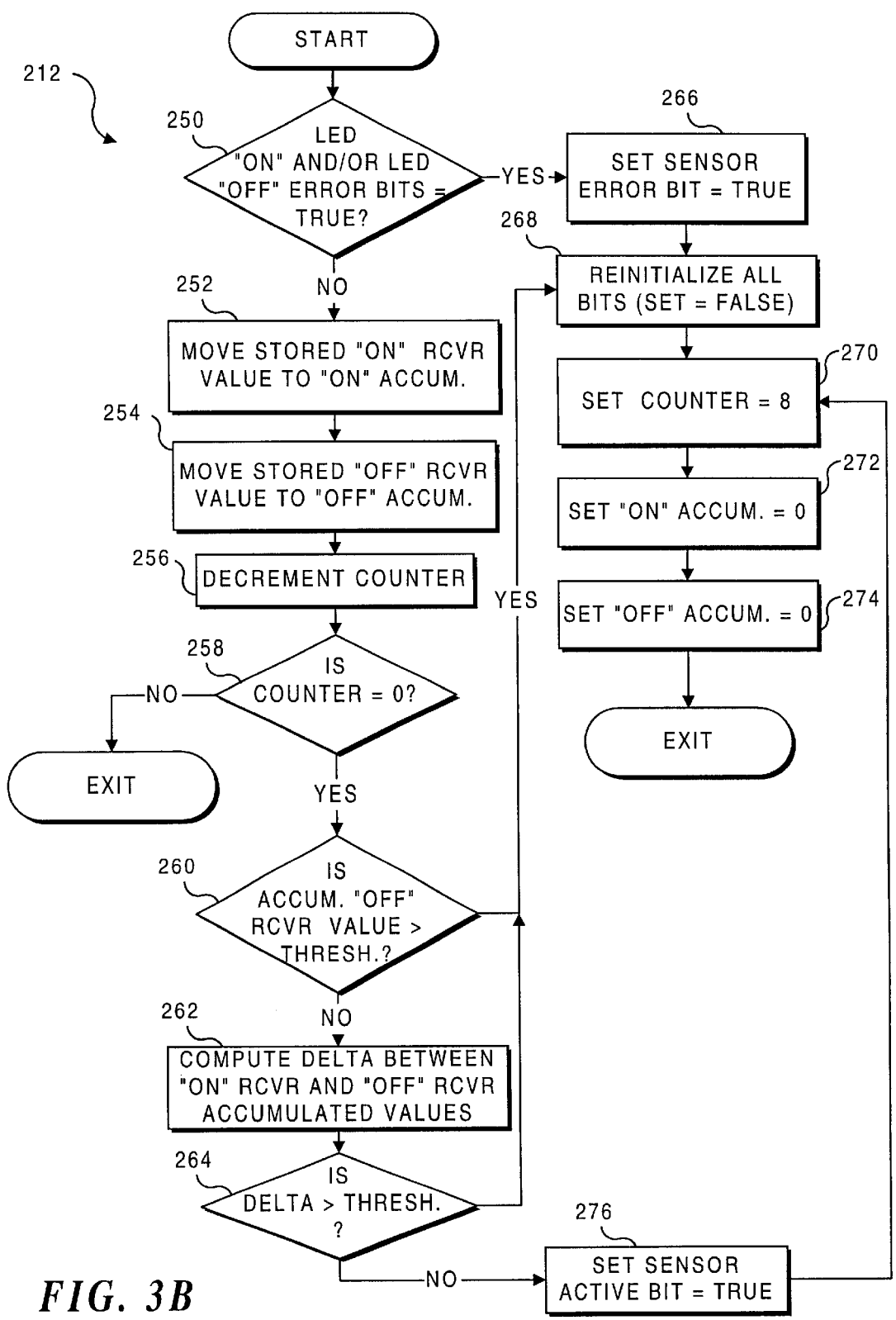
FIG. 3B is a block diagram of the logic flow that determines the reject of false triggering of the sensor that is caused by ambient light sources.

Turning now to FIG. 3B, a flow chart that addresses the logical steps within block 212 are shown. Beginning at a start block, the logic moves to a decision block 250 to determine if either the LED "on" or the LED "off" error bits are set to true. If either bit is true, the logic moves to a block 266 and the sensor error bit is set to true. The logic steps to a block 268 to reinitialize the error and control bits, i.e., the LED "on" error, LED "off" error, and sensor active bits are set to false. The logic moves to a block 270 in which the counter is re-initialized to a value of eight. The logic then advances to a block 272, and the "on" accumulator value is zeroed. The logic proceeds to a block 274, and the "off" accumulator value is zeroed. The logic jumps back to the main body of the program and exits the at block 212.

However, if the determination at decision block 250 was false, the program advances to a block 252 in which the stored digitized value of the "on" RCVR signal is accumulated in the "on" accumulator. The logic then flows to a block 254 where the stored "off" RCVR signal is accumulated in the "off" accumulator. Thereafter, in a block 256, the value of the counter is decremented. After decrementing the counter, the next step occurs in a decision block 258. In this decision block, a determination is made as to whether the counter value is equal to zero. If false, the procedure concludes in block 212 and returns to the main flow of the program.

The logic continues to loop back through the main body of the program to decision block 258 until eight values of the RCVR values have been accumulated in both the "on" accumulator and the "off" accumulator. Accumulation of these values represents an implicit sliding window average of the most recent eight "on" and eight "off" RCVR values.

Once the value of the counter is determined to be zero at decision block 258, the logic moves to a decision block 260 to determine whether the averaged "off" RCVR value is greater than a predetermined threshold value. If true, the next step is block 268, and the program proceeds as described above. If false, the logic moves to a block 262, and the difference or delta between the average "on" RCVR value and the average "off" RCVR value is computed. The logic moves to a decision block 264, and a determination is made as to whether the delta is greater than another predetermined threshold value. If true, the logic jumps to block 268 and follows the logic flow as detailed above. However, if the determination is false, the logic steps to a block 276, and the sensor active bit is set to true. Finally, the logic jumps to block 270 and proceeds as described above, finally returning to the main flow of the program.

The actuators of the preferred embodiment are electrical motors having linkages that are coupled to the handle of the joystick, and the motors are disposed within the base of the joystick. Another embodiment of the claimed invention could employ alternative types of actuators, such as pneumatic, hydraulic, or mechanical. Furthermore, it will be apparent that the present invention is applicable to devices that include more than the two actuators (X-axis and Y-axis) employed in the preferred embodiment described above. For example, an additional actuator could be used to generate linear or rotational movement relative to the vertical axis (Z-axis) of the joystick control handle.

It should be noted that the present invention can be practiced using other types of switches besides the optical switch described above. For example, a mechanical switch that is actuated by the user gripping the control handle may be employed instead of the optical switch. Further alternatives include a capacitive or proximity switch that responds to the inherent capacitance of a user's body when applied to grip a control member of the device, or a pressure sensitive switch that responds to the pressure applied by a user gripping the control member. Details of these alternative switches are not shown, but suitable switches of these types are readily available or easily fabricated by one of ordinary skill in the art.

Figure 5A:
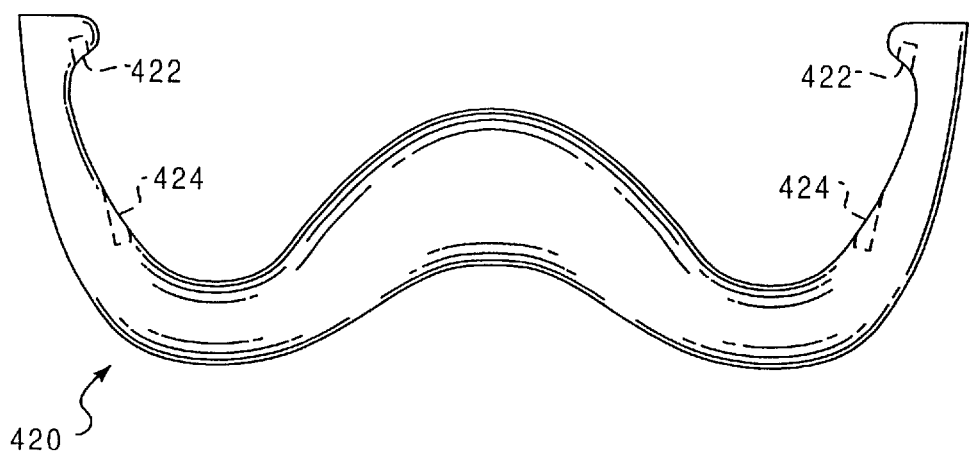
FIG. 5A is a front elevational view of a force feedback yoke (support and base not shown) to which the present invention is alternatively applied.
Figure 5B:
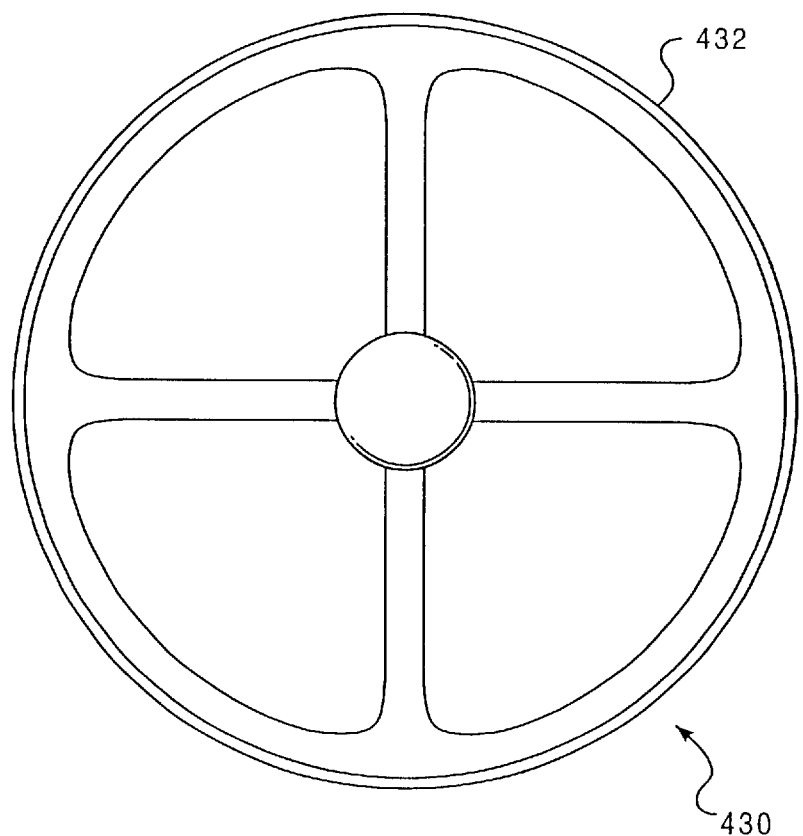
FIG. 5B is a front elevational view of a force feedback steering wheel game control (support and base not shown) to which the present invention is alternatively applied.
Figure 5C:
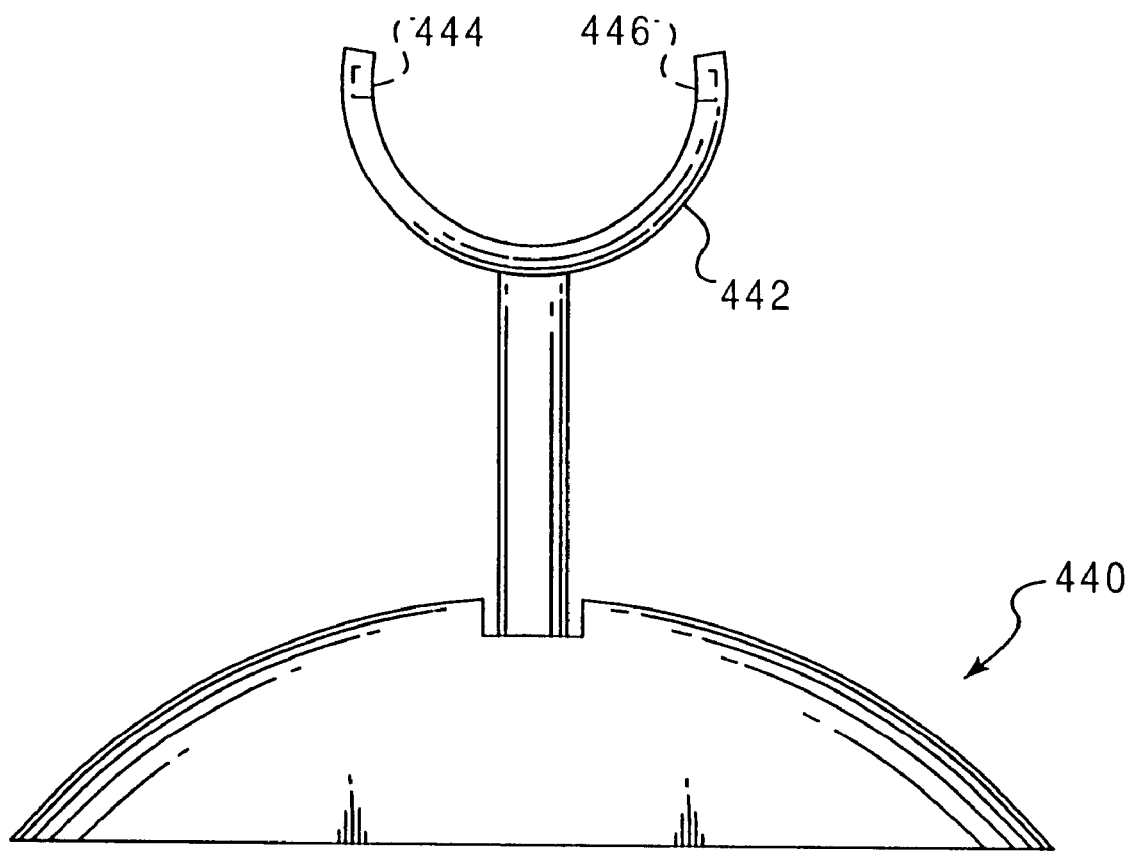
FIG. 5C is a side elevational view of a force feedback digit cradle to which the present invention is alternatively applied.

It should also noted that although the present invention is specifically disclosed for controlling the feedback force applied to a haptic feedback joystick 400, as shown in FIG. 4, it is also applicable to other types of gaming control devices in which haptic feedback is used, such as a force feedback yoke 420, as shown in FIG. 5A, and a digit cradle 440 as shown in FIG. 5C. Yoke 420 includes a pair of light sources 422, one of each being mounted at the top of each hand grip portion of the yoke, and a corresponding pair of light sensors 424, mounted below the hand grip portion of the yoke. The digit cradle includes a cradle 422 for receiving the user's forefinger. On one side of the cradle is disposed a light source, and on the opposite side is disposed a light sensor for sensing the presence of the user's finger in the cradle.

A force feedback steering wheel 430, which is shown in FIG. 5B, includes a pressure switch or a capacitive (proximity) switch 432 around the rim of the steering wheel. Either of these types of switches is suitable for detecting the grip of the user on the steering wheel control member to implement the present invention.

The preferred embodiment discussed above controls the magnitude of the feedback force generated by a joystick and applied to its control handle when the user initially grips the handle or releases the control handle. It is also envisioned that the present invention might be applied to devices that generate force independent of the user's control actions, e.g., to tools or other devices that are intended to be held by the user. The physical disposition of the switch for detecting the grip of the user may be altered, but the functionality of the present invention can be applied in much the same manner disclosed above.

In addition to responding to the removal of the user's hand from the control handle of the joystick by disabling the application of force, the host computer can be programmed to respond to the RCVR signal by placing an application that is executing on the host computer (and which is controlling the haptic joystick) in a pause mode or placing the operating system and host computer in a "sleep" mode in which it powers down to a standby state. Either the application or the operating system may be programmed to respond to the status of the RCVR signal and thus, to the presence of the user's grip on the control handle.

As yet another alternative, an application may send a signal to the MCU that causes it to disable the application of the force to the control handle in respond to the user entering a pause command in an application, in the same manner disclosed above when the MCU responds to the user releasing the control handle. Since the ability to immediately disable the application of force when the control handle is released is included in the haptic joystick, the same response can readily be applied to the user pausing a game or other application that is normally controlling the haptic joystick.

Although the present invention has been described in connection with the preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. An electrical circuit for controlling a device that generates a force, comprising:
    (a) a switch having an open state and a closed state, said switch being actuated and changing state when the user is positioned to operate the device;
    (b) sensing means for sensing a state of the switch; and
    (c) a processor that is coupled to said sensing means, said processor responding to the state of the switch to control the device, immediately disabling generation of the force if the state of the switch changes to indicate that the user has just moved and is no longer positioned to operate the device, and enabling a slow increase in the force generated if the state of the switch changes to indicate that the user has just become positioned to operate the device.

2. An electrical circuit for controlling a force applied by a device to a user through a member of the device that is gripped by the user, comprising:
    (a) a switch having a first state and a second state, said switch being actuated by the user gripping the member so that the switch changes to the first state when the user grips the member and changes to the second state when the user releases the member; and
    (b) a processor that is coupled to said switch, the processor responding to the state of the switch to control the application of the force to the member by immediately disabling application of the force when the switch changes to the second state, indicating that the user has released the member, and enabling a slow increase in the force applied immediately after the switch changes to the second state, indicating that the user has just gripped the member.

3. A sensor circuit for determining whether a user is gripping a member of a haptic feedback device to control a force applied to the member, comprising:
    (a) a source of a light signal;
    (b) a sensor for detecting the light signal, the user gripping the member affecting a path of the light signal from the source to the sensor, said sensor producing an output signal indicative of the light signal detected by the sensor, said output signal changing due to the affect of the user gripping the member; and
    (c) a processor coupled to the source of the light signal and to the sensor, said processor:
        (i) enabling the source to produce the light signal for a first time interval;
        (ii) monitoring the output signal of the sensor during the first time interval;
        (iii) disabling the source during a second time interval so that the source does not produce the light signal;
        (iv) monitoring the output signal of the sensor during the second time interval;
        (v) as a function of the output signal during the first time interval and the output signal during the second time interval, determining whether the user is gripping the member; and
        (vi) enabling the force to be applied to the member when the user is gripping the member, but not when the user is not gripping the member.

4. The electrical circuit of claim 3, wherein the source and the sensor are disposed proximate the member and positioned relative to each other so that the user gripping the member interrupts the path of the light signal between the source and the sensor.

5. The electrical circuit of claim 3, wherein the processor monitors the source to determine that the source is operational when enabled.

6. The electrical circuit of claim 3, wherein the source and the sensor are disposed proximate the member and positioned relative to each other so that the user gripping the member reflects the light signal from the source toward the sensor.

7. The electrical circuit of claim 3, wherein the processor periodically enables the source, alternating the first time interval with the second time interval.

8. The electrical circuit of claim 7, wherein the processor determines a first average value of the output signal when the source is enabled and a second average value of the output signal when the source is disabled, finds the difference between said average values, and as a function of the difference, determines whether the user is gripping the member.

9. The electrical circuit of claim 8, wherein the processor employs a first running average windows to determine the first average value and a second running average window to determine the second average value, said first and second running average windows each being based on a predefined number of values of the output signal.

10. The electrical circuit of claim 3, wherein the light signal is within a non-visible waveband.

11. The electrical circuit of claim 3, wherein the member comprises one of a control handle, a yoke, a steering wheel, and a digit cradle.

12. An electrical circuit for controlling application of a feedback force to a user by a member of a device, comprising:
    (a) a source that emits light when energized;
    (b) a light sensor that provides an output signal indicative of whether light from the source is incident on the sensor, the source and the sensor being disposed proximate the member and spaced apart from each other so that a light path between the source and the sensor is obstructed when the user grips the member, preventing light emitted by the source from reaching the sensor; and (c) a processor that is coupled to said sensor to receive the output signal and thereby to determine when the user is gripping the member in order to disable generation of the feedback force when the user is not gripping the member, said processor being coupled to the source to determine whether the source has failed, and if so, also disabling the feedback force.

13. The electrical circuit of claim 12, wherein the source emits infrared light.

14. The electrical circuit of claim 13, wherein the source includes a light emitting diode.

15. The electrical circuit of claim 12, wherein the processor determines that the source has failed by detecting that an electrical current is not flowing through the source when the source should be energized.

16. The electrical circuit of claim 12, further comprising a filter coupled between the light sensor and the processor to suppress high frequency components.

17. The electrical circuit of claim 12, wherein processor causes the source to be periodically energized and then de-energized, said processor detecting differences in the output signal from the light sensor while the source is both energized and de-energized to determine if the user is gripping the member.

18. The electrical circuit of claim 12, wherein one of the source and the light sensor is disposed in the member, and the other of the source and the light sensor, and the processor are disposed in another portion of the device.

19. The electrical circuit of claim 12, wherein the member comprises one of a joystick handle, a yoke, a steering wheel, and a digit cradle.

20. A method for controlling a force applied by a device to a user gripping a member of the device, comprising the steps of:

(a) sensing a first change in a state of a switch when the user grips the member;

(b) sensing a second change in the state of the switch when the user releases the member;

(c) enabling the force applied to the user to slowly increase in response to the first change in the state of the switch, to provide time for the user to firmly grip the member before the force is applied; and (d) immediately disabling the force in response to the second change in the state of the switch, so that the force is no longer applied once the user has released the member.

21. A method for controlling a feedback force applied to a user through a member of a control device that is gripped by the user, comprising the steps of:

(a) detecting an electrical circuit changing to a first state when the user grips the control member and the electrical circuit changing to a second state when the user releases the control member;

(b) enabling a slow increase in the feedback force that is applied immediately after the electrical circuit changes to the first state, indicating that the user has just gripped the member, to enable the user time to more firmly grip the member before a full magnitude of the feedback force is applied; and (c) immediately disabling application of the feedback force when the electrical circuit changes to the second state, indicating that the user has just released the control member, to prevent the control member from causing injury to the user.

22. The method of claim 21, further comprising the step of determining whether the electrical circuit has failed, and if so, immediately disabling application of the feedback force.

23. The method of claim 21, wherein the electrical circuit includes a source of a light signal affected by the user gripping the control member and a sensor responsive to the light signal that produces an output signal indicative of whether the user is gripping the control member, further comprising the steps of:

(a) periodically enabling and disabling the source;

(b) determining a first average value of the output signal when the source is enabled and a second average value of the output signal when the source is disabled;

(c) determining a difference between said average values; and (d) as a function of the difference, determining whether the user is gripping the member.

24. The method of claim 21, wherein the electrical circuit includes a source of infrared light and a light sensor responsive to the infrared light, said user gripping the control member affecting a path of the light between the source and the sensor.

25. The method of claim 21, wherein the control member of the device comprises one of a joystick handle, a yoke, a steering wheel, and a digit cradle.

26. A method for controlling application of a feedback force to a user by a member of a device, comprising:

(a) providing a source that emits light when energized;

(b) providing a light sensor that produces an output signal indicative of whether light from the source is incident on the sensor;

(c) mounting the source and the sensor proximate the member and spaced apart from each other so that a light path between the source and the sensor is obstructed when the user grips the member, preventing light emitted by the source from reaching, the sensor;

(d) determining whether the user is gripping the member in order to disable generation of the feedback force when the user is not gripping the member; and (e) determining whether the source has failed, and if so, also disabling generation of the feedback force.

27. The method of claim 26, wherein the processor determines that the source has failed by detecting that an electrical current is not flowing through the source when the source should be energized.

28. The method of claim 26, further comprising the step of periodically energizing and then de-energizing the source, wherein the step of detecting whether the user is gripping the member comprises the step of determining differences in the output signal from the light sensor while the source is both energized and de-energized, said differences being substantial when the user is not gripping the member.

29. The method of claim 26, further comprising the step of suppressing high frequency components in the output signal.

30. The method of claim 26, wherein the member comprises one of a joystick control handle, a steering wheel, a yoke, and a digit cradle.

31. The method of claim 26, further comprising the step of providing an indication that the user has released the member to a host computer to which the device is coupled, said host computer responding by pausing execution of a software program that has control of the device.

32. The method of claim 26, further comprising the step of disabling generation of the feedback force in response to a signal from a host computer to which the device is coupled indicating that the user has paused execution of an application being executed on the host computer, where said application is controlling the device.

* * * * *